United States Patent Office 3,383,211

Patented May 14, 1968

3,383,211
LITHOGRAPHIC PRINTING PLATES

Jan Pieter Poels and Gerard Michiel Sevens, Wilrijk-Antwerp, and Louis Maria de Haes, Edegem, Belgium, assignors to Gevaert Photo-Producten N.V., Mortsel-Antwerp, Belgium, a Belgian company No Drawing. Filed Apr. 20, 1964, Ser. No. 361,220
Claims priority, application Belgium, Apr. 26, 1963, 42,581, Patent 639,225; Oct. 28, 1963, 43,106, Patent 631,557
6 Claims. (Cl. 96—29)

The invention relates to a process for producing improved lithographic printing plates.

In the British patent specification 913,591 a process is described for the manufacture of lithographic printing plates comprising image-wise exposing a light-sensitive material containing a silver halide emulsion layer, developing the said light-sensitive material, complexing the unexposed and undeveloped silver halide, transferring these silver complexes onto a metallic layer and image-wise precipitating silver from the silver complexes by the reducing action of the metallic layer itself.

According to said process the successive processing steps should be carried out in well-defined conditions. Nevertheless, to some extent the silver image is incomplete and of low density which is not of benefit to the hydrophobic-hydrophilic differentiation of the lithographic printing plate.

It has now been found that the process is considerably improved by using a light-sensitive material bearing a water-permeable unhardened layer on the silver halide emulsion layer.

By proceeding in this way the conditions for carrying out the successive processing steps may indeed vary considerably.

Moreover, the process according to the present invention leads to an improved lithographic printing plate, since the silver image formed on the metallic layer is of higher density and is more complete and presents a greater hydrophobicity in relation to the metallic layer. The image is therefore able more quickly to accept hydrophobic lacquer such as may be applied thereto for solidifying the lithographic printing plate and for ensuring a higher ink-receptivity so that only little difference of ink-affinity subsists between the lithographic printing plate rubbed with lacquer and the non-rubbed printing plate.

In United States patent application Ser. No. 846,256, now U.S. Patent 3,300,306, issued January 24, 1967, a process is described for manufacturing lithographic printing plates by applying silver to a metallic layer according to the silver salt diffusion transfer process and applying a protective layer to the light-sensitive layer. Reference is also made to the possibility of controlling the degree of hardening of the emulsion layer to improve the adherence of the light-sensitive material to the printing plate. If a hardened top layer is selected as the protective layer for the purposes of the process in question, the above-mentioned advantages according to the present invention, however, cannot be obtained. It was very surprising therefore, that the substitution of an unhardened layer for the known hardened layer should lead to the advantages of the present invention.

Light-sensitive materials suitable for use in the present invention comprise, in general a support, a light-sensitive silver halide emulsion layer and a water-permeable unhardened layer applied directly or indirectly to this emulsion layer. It is evident that the light-sensitive material may also contain an intermediate or subbing layer in addition to said layers.

Appropriate substances for forming the unhardened water-permeable layer, whether alone or in combination with one or more other substances are, e.g., the following water-permeable colloids: methylcellulose, the sodium salt of carboxymethylcellulose, hydroxyethylcellulose, hydroxyethylstarch, hydroxypropylstarch, sodium alginate, esters of alginic acid, tragacanth gum, starch, polyvinyl alcohol, polyacrylic acid, polyacryl amide, polyvinyl pyrrolidone, polyoxyethylene, copolymer of methylvinyl ether and maleic acid. Such substances may be used singly or two or more of them together. Besides at least one water-permeable colloid the unhardened layer may further contain all sorts of ingredients which may also be present in the light-sensitive layer or in another layer. More details on these ingredients are given further on in the description. The thickness of the unhardened layer may vary within large limits depending on the nature of the colloid chosen, the ingredients eventually present in the layer, and the viscosity of the used colloid solution, etc. Preferably, however, the thickness of the unhardened layer is such that 0.1 to 2 g. of a said colloid binding agent is present per sq. m. of light-sensitive material. Generally the unhardened layer is coated from an aqueous solution to which surfactants may be added in order to enhance the coating speed and to be able to apply the unhardened layer without previously having to dry the gelatino silver halide emulsion layer.

As appropriate surfactants may be cited for example—

A combination of

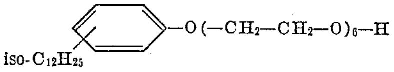

with $$H_3C—(CH_2)_3—CH(C_2H_5)—CH_2—CH_2—CH(SO_4Na)—CH_2—CH(CH_3)_2$$

A combination of

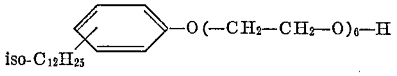

with at least one occasionally branched hydrocarbon sulphonate corresponding with the general formula $C_nH_{2n+1}SO_3Na$, wherein $n$ is comprised between 10 and 16, and A combination of at least one hydrocarbon sulphonate of the said class with $$H_3C—(CH_2)_7—CH{=}CH—(CH_2)_7—CO—N(CH_3)—CH_2—CH_2—SO_3Na$$

for the case the coating composition of the light-sensitive gelatino silver halide emulsion layer contains a combination of saponine with at least one other surfactant selected from the group consisting of

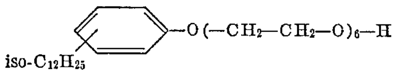

$$H_3C—(CH_2)_3—CH(C_2H_5)—CH_2—CH_2—CH(SO_4Na)—CH_2—CH(CH_3)_2$$

hydrocarbon sulphonates as described above $$H_3C—(CH_2)_7—CH{=}CH—(CH_2)_7—CO—N(CH_3)—CH_2—CH_2—SO_3Na$$

For more particulars concerning the nature of suitable supports of light-sensitive silver halide emulsion layers, of other layers and also of ingredients which may be incorporated into at least one of the layers of the light-sensitive material, the British patent specification 913,591 and United States patent application Serial Number 846,256.

Concerning the nature of the metallic layer whereon the silver image is formed, reference is made by way of example to the British patent specification 913,591, the United States patent applications Ser. Nos. 846,256 and 241,554 and the Belgian patent specification 631,557.

Processing liquids, suitable for use according to the present diffusion transfer process are described in the British patent specification 913,591, the United States patent applications Ser. Nos. 846,256 and 296,096. Such liquid may incorporate developer, or this may be incorporated in the light-sensitive material, in which case the processing liquid may be one which only serves for activating or wetting.

The present process may be carried out as follows: the light-sensitive material bearing an unhardened water-permeable layer on the light-sensitive silver halide emulsion layer is image-wise exposed to an original, whereupon said light-sensitive material either alone or together with the material containing the metallic layer is moistened with the processing liquid. Both materials are then brought in contact with each other during a time which may vary within wide limits and afterwards the materials are separated from each other. These limits depend on many factors but especially on the nature of the light-sensitive material. It is not beyond possibility that on separation, in some cases, particularly when the light-sensitive layer is more or less hardened, at least a thin layer of the unhardened water-permeable layer is transferred to the metallic layer. This, however, involves no complications since the transferred part disappears spontaneously, either during the first of the various treatments of the lithographic printing plate before it is ready for use, or during printing.

Generally the lithographic printing plate is thus treated with a special etching solution, improving the hydrophilic properties of the non-printing areas and the hydrophobic properties of the printing areas (the areas bearing the silver) of the lithographic printing plate. Such etching solutions are described in the British patent specification 913,591 and the United States patent application Ser. No. 846,256. Besides the compounds mentioned in said patent specification and patent application for improving the hydrophobic properties of the printing areas and being suitable to be incorporated in the etching solution, also oleic acid in a concentration of 0.5 cc. to 20 ccs. per liter and ammonium nitrate, preferably in a concentration of 0.5 g. to 10 g. per liter, may be added to the etching solution for the same purpose with good results. The use of oleic acid as a compound for improving the hydrophobic properties of the lithographic printing plates is described by P. J. Hartsuch in "Chemistry of Lithography" (1954) p. 134, whereas the use of ammonium nitrate in a lithographic processing liquid for lithographic printing plates is known from "L'Imprimerie Nouvelle" (December 1961) p. 37.

Instead of being treated with an etching solution the lithographic printing plate may also be processed as described in the Belgian patent specification 631,557.

Finally the lithographic printing plate can be rubbed with a hydrophobic lacquer in order to strengthen the hydrophobic areas covered therewith and to enhance the ink-receptivity of said areas. Suitable lacquer compositions are described in the United States patent application Ser. No. 114,027 and the Belgian patent specification 631,790.

From the foregoing it clearly appears that the present process offers a considerable improvement to the printing technique, especially in those cases where lithographic printing plates with excellent quality have to be obtained.

The following examples illustrate the invention.

EXAMPLE 1

To a light-sensitive gelatin silver chloride emulsion is added cadmium chloride (silver/cadmium) (3:1). This light-sensitive emulsion is coated on a paper support of 120 g./sq. m. in such a way that an amount of silver chloride is present per sq. m. equivalent to 1.33 g. of silver.

To this light-sensitive layer a layer is applied from the following solution in such a way that 1 liter thereof covers 20 sq. m.:

| | |
|---|---|
| Water ccs. | 1000 |
| Hydroxyethyl starch with a substitution degree of hydroxyethyl groups of 0.27 g. | 40 |
| 10% aqueous saponine ccs. | 10 |

This light-sensitive material is image-wise exposed. The image-wise exposed light-sensitive material and an aluminium sheet which consists of 99.5% of aluminium and 0.5% of magnesium and silicon, and the surface of which was brushed to grain depths of 2 to 4$\mu$, are fed together through an apparatus of the type commonly used in the silver salt diffusion transfer process. Said apparatus contains an aqueous developing solution of the following composition:

| | G. |
|---|---|
| Sodium hydroxide | 11 |
| Sodium sulphite (anhydrous) | 100 |
| Sodium thiosulphate (anhydrous) | 6 |
| Potassium bromide | 1.5 |
| Hydroquinone | 9 |
| 1-phenyl-3-pyrazolidone | 1.5 |
| Trisodium salt of ethylenediamine tetracetic acid | 4 |
| Water to 1000 ccs. | |

The light-sensitive material and the aluminium sheet are pressed together and after a contact time of 10 sec. separated from each other. An image-wise and dense silver deposit is obtained on the aluminium sheet.

In order to improve the hydrophobic-hydrophilic differentiation of the lithographic printing plate thus obtained it is rubbed for 30 sec. with a plug of wadding soaked with the following etching solution:

| | G. |
|---|---|
| Carboxymethylcellulose | 3.24 |
| Trisodium phosphate | 0.6 |
| Phosphoric acid | 0.3 |
| Ammonium nitrate | 1 |
| Cetyltrimethylammonium bromide | 0.06 |
| 20% aqueous formaldehyde solution | 1 |
| Water to 100 ccs. | |

In order to strengthen the printing areas of the lithographic printing plate a hydrophobic lacquer as described in the Unites States patent application Ser. No. 114,027 is applied finally to said lithographic printing plate. The thus obtained lithographic printing plate is of extremely good quality and is markedly better than a lithographic printing plate which is manufactured according to a process in which the coating of the hydroxyethyl starch layer on the light-sensitive material is omitted but which is otherwise the same.

EXAMPLE 2

The process of Example 1 is repeated, but with a light-sensitive material which instead of a water-permeable layer of hydroxyethyl starch comprises a water-permeable layer applied from the following solution:

| | |
|---|---|
| Water ccs. | 1000 |
| Polyacrylamide of medium viscosity range (a 5% aqueous solution of which has a viscosity comprised between 280 and 600 cp. at 25° C.) g. | 10 |
| 10% aqueous saponine ccs. | 10 |

This solution is applied in such a way that 1 liter covers 10 sq. m.

A lithographic printing plate of exceptional good quality is obtained.

EXAMPLE 3

The process of Example 1 is repeated. Surfactants are added to the various coating compositions in order to apply the light-sensitive emulsion layer and the hydroxyethyl starch layer very quickly, i.e. without having to dry the former before applying the latter.

To 1 kg. of the light-sensitive coating composition are added:

| | Ccs. |
|---|---|
| 10% solution of saponine in water | 20 |
| 5% solution of 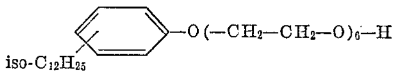 in a mixture of water and ethanol (50/50) | 10 |
| 5% solution of a mixture of hydrocarbon sulphonates as described above in water | 30 |

To 1 liter of hydroxyethyl starch solution are added:

| | Ccs. |
|---|---|
| 5% solution of 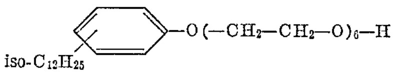 in a mixture of water and ethanol (50/50) | 30 |
| 5% solution of a mixture of hydrocarbon sulphonates as described above in water | 30 |

What we claim is:

1. A process for producing a lithographic printing plate comprising image-wise exposing a light-sensitive material bearing a silver halide emulsion layer and a superposed water-permeable unhardened colloid layer, bringing said light-sensitive material in the presence of developer substances, a complexing agent for silver halide, an alkali and a processing liquid into contact with a metallic layer onto which silver from the non-exposed, complexed silver halide, which diffuses from said emulsion layer through said water-permeable colloid layer, settles by the reducing action of the metallic layer itself, and separating said materials from each other.

2. A process according to claim 1, wherein the unhardened layer contains a hydroxyalkylstarch as a binding agent.

3. A process according to claim 1, wherein the unhardened layer contains hydroxyethylstarch as a binding agent.

4. The process of claim 1 wherein said superposed, unhardened water-permeable layer has a thickness equal to about 0.1–2 grams of water-permeable material per square meter of said light-sensitive material.

5. A process for producing a lithographic printing plate comprising image-wise exposing a light-sensitive material bearing a silver halide emulsion layer and a superposed water-permeable unhardened colloid layer containing a hydroxyalkylstarch as the essential colloidal binding agent, bringing said light-sensitive material in the presence of developer substances, a complexing agent for silver halide, an alkali and a processing liquid into contact with an aluminum layer onto which silver from the non-exposed, complexed silver halide, which diffuses from said emulsion layer through said colloid layer, settles by the reducing action of the aluminum layer itself, and separating said materials from each other.

6. A process for producing a lithographic printing plate comprising image-wise exposing light-sensitive material bearing a silver halide emulsion layer and a superposed water-permeable unhardened colloid layer containing a hydroxyethylstarch as the essential colloidal binding agent, bringing said light-sensitive material in the presence of developer substances, a complexing agent for silver halide, an alkali and a processing liquid into contact with an aluminum layer onto which silver from the non-exposed, complexed silver halide, which diffuses from said emulsion layer through said colloid layer, settles by the reducing action of the aluminum layer itself, and separating said materials from each other.

References Cited

UNITED STATES PATENTS

| | | | |
|---|---|---|---|
| 3,152,906 | 10/1964 | Overman | 96—29 X |
| 3,186,842 | 6/1965 | De Haes et al. | 96—29 |
| 3,203,796 | 8/1965 | Verelst | 96—29 |

FOREIGN PATENTS

| | | |
|---|---|---|
| 565,696 | 3/1958 | Belgium. |

NORMAN G. TORCHIN, *Primary Examiner.*

R. E. MARTIN, *Assistant Examiner.*